US 11,774,339 B2

(12) United States Patent
Linneen

(10) Patent No.: US 11,774,339 B2
(45) Date of Patent: Oct. 3, 2023

(54) SYSTEM AND METHOD FOR CONTROLLING METAL OXIDE GEL PARTICLE SIZE

(71) Applicant: X ENERGY, LLC, Rockville, MD (US)

(72) Inventor: Nicholas Linneen, Knoxville, TN (US)

(73) Assignee: X Energy, LLC, Rockville, MD (US)

(*) Notice: Subject to any disclaimer, the term of this patent is extended or adjusted under 35 U.S.C. 154(b) by 55 days.

(21) Appl. No.: 17/215,691

(22) Filed: Mar. 29, 2021

(65) Prior Publication Data
US 2021/0302295 A1  Sep. 30, 2021

Related U.S. Application Data

(62) Division of application No. 16/530,695, filed on Aug. 2, 2019, now Pat. No. 10,962,461.

(51) Int. Cl.
G01N 15/02 (2006.01)
G01N 11/12 (2006.01)
G01N 11/00 (2006.01)

(52) U.S. Cl.
CPC ......... *G01N 15/0205* (2013.01); *G01N 11/12* (2013.01); *G01N 2011/008* (2013.01); *G01N 2015/025* (2013.01)

(58) Field of Classification Search
CPC ............... G01N 15/0205; G01N 11/12; G01N 2011/008; G01N 2015/025;
(Continued)

(56) References Cited

U.S. PATENT DOCUMENTS 5,998,215 A   12/1999   Prather et al.
7,811,526 B2  10/2010   Okubo et al.
(Continued)

FOREIGN PATENT DOCUMENTS

DE        19911654 C1      12/2000
DE   10 2007 052 795 A1    5/2009
(Continued)

OTHER PUBLICATIONS

Karnowski, et al., "A simple optical system for real-time size measurements of TRISO fuel pellets", Proc. SPIE 5679, Machine Vision Applications in Industrial Inspection XIII, 13 pages. (Feb. 24, 2005). (Downloaded From: https://www.spiedigitallibrary.org/conference-proceedings-of-spie on Oct. 29, 2018).
(Continued)

Primary Examiner — Tri T Ton
(74) Attorney, Agent, or Firm — Kramer & Amado, P.C.

(57) ABSTRACT

Metal oxide gel particles, may be prepared with a desired particle size, by preparing a low-temperature aqueous metal nitrate solution containing hexamethylene tetramine as a feed solution; and causing the feed solution to flow through a first tube and exit the first tube as a first stream at a first flow rate, so as to contact a high-temperature nonaqueous drive fluid. The drive fluid flows through a second tube at a second flow rate. Shear between the first stream and the drive fluid breaks the first stream into particles of the metal nitrate solution, and decomposition of hexamethylene tetramine converts metal nitrate solution particles into metal oxide gel particles. A metal oxide gel particle size is measured optically, using a sensor device directed at a flow of metal oxide gel particles within the stream of drive fluid. The sensor device measures transmission of light absorbed by either the metal oxide gel particles or the drive fluid, so that transmission of light through the drive fluid changes for a
(Continued)

period of time as a metal oxide gel particle passes the optical sensor. If a measured particle size is not about equal to a desired particle size, the particle size may be corrected by adjusting a ratio of the first flow rate to a total flow rate, where the total flow rate is the sum of the first and second flow rates.

20 Claims, 4 Drawing Sheets

(58) Field of Classification Search
CPC ......... G01N 15/1459; G01N 2015/003; C01G 1/02; C01G 43/01; C01P 2004/32; C01P 2004/60; Y02E 30/30
USPC .................................................. 356/300–343
See application file for complete search history.

(56) References Cited

U.S. PATENT DOCUMENTS

| | | | |
|---|---|---|---|
| 7,929,135 B2 | 4/2011 | Nakano et al. | |
| 8,160,201 B2 | 4/2012 | Banchet et al. | |
| 9,927,343 B2 | 3/2018 | Braumandl et al. | |
| 10,371,620 B2 * | 8/2019 | Knollenberg | ...... G01N 15/1459 |
| 2008/0221814 A1 | 9/2008 | Trainer | |
| 2011/0163265 A1 | 7/2011 | Collins | |

FOREIGN PATENT DOCUMENTS

| | | |
|---|---|---|
| WO | 00/14511 A1 | 3/2000 |
| WO | 2009/132198 A3 | 10/2009 |

OTHER PUBLICATIONS

Liu, "An improved design of TRISO particle with porous SiC inner layer by fluidized bed-chemical vapor deposition", Journal of Nuclear Materials 467, pp. 917-926 (2015) (http://dx.doi.org/10.1016/j.jnucmat.2015.10.055).
McAlister, Al et al., 'Demonstration of rnicrofluidics for synthesis of sol-gel feedstocks', Oak Ridge National Laboratory, Mar. 2019, No. ORNL/SPR-2019/1082.
Pai, Raj Esh V. et aL, 'Fabrication of dense (Th,U)O2 pellets through micmspheres impregnation technique', Jou ma I of Nuclear Materials, 2008, vol. 381, pp. 249-25.
International Search Report—PCT/US2020/044232; dated Jul. 30, 2020 (dated Jul. 30, 2020).
Jeffrey A. Katalenich et al., "Production of Monodisperse Cerium Oxide Microspheres with Diameters Near 100m by Internal-Gelation Sol-Gel Methods," Journal of Sol-Gel Science and Technology, Springer, New York, NY vol. 86, No. 2, Apr. 10, 2018.
Extended Search Report for European Patent Application No. 20850205.4 dated Jul. 14, 2023.

* cited by examiner

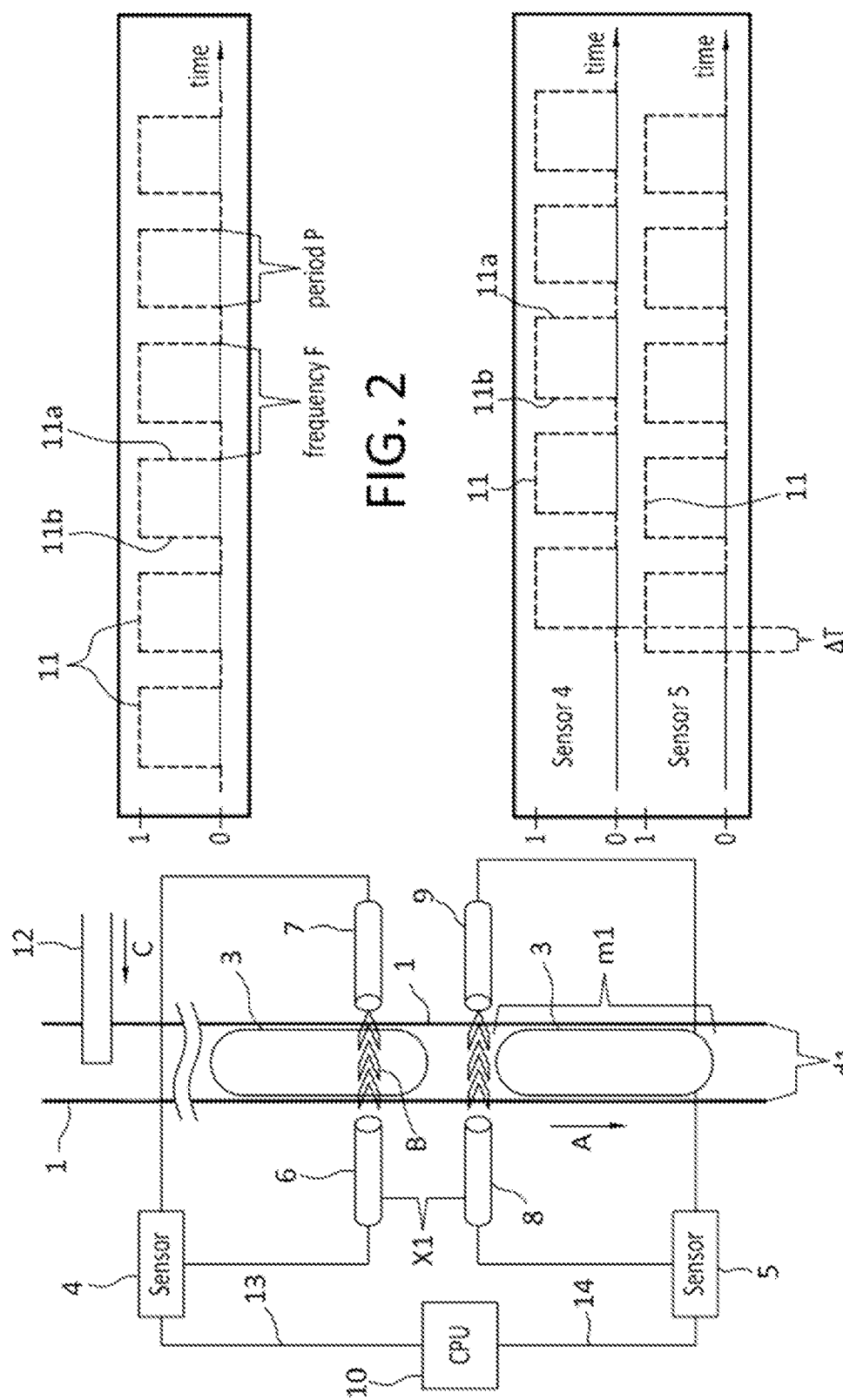

SYSTEM AND METHOD FOR CONTROLLING METAL OXIDE GEL PARTICLE SIZE

CROSS-REFERENCE TO RELATED APPLICATIONS

This application is a divisional of parent U.S. application Ser. No. 16/530,695 filed on Aug. 2, 2019. The entire disclosure of the prior application is hereby incorporated by reference in its entirety.

STATEMENT OF GOVERNMENT SUPPORT

This invention was made with government support under Grant No. DE-NE0008472 awarded by the Department of Energy. The government has certain rights in the invention.

BACKGROUND

1. Field of the Disclosure

This invention relates generally to preparation of metal oxide gel particles having a controlled particle size.

2. Description of Related Art

Metal oxide gel particles may be prepared by dispersion of droplets of a metal salt solution in a nonaqueous fluids, and causing the metal salt in the droplets to undergo internal gelation to form a gel phase in the form of metal oxide gel particles.

Metal oxide gel particles may be prepared using a two-fluid nozzle, from solutions of a variety of metal salts or metal oxide salts, including nitrates of uranium, thorium, plutonium, and lanthanide metals such as cerium. The salt solution contains hexamethyltetramine (HMTA) and urea, and flows from a first nozzle at a first flow rate, into a stream of a nonaqueous drive fluid in a second nozzle. The non-aqueous drive fluid is heated to a temperature sufficient to induce HMTA decomposition.

In the case of a uranyl nitrate solution, before the salt solution contacts the drive fluid, metal ion-urea complexes of formula $UO_2((NH_2)_2CO)_2^{+2}$ form, where the urea may help mitigate premature gelation. When the metal ion-urea complexes are heated by the drive fluid, they may dissociate to form $UO_2^{+2}$ or similar uranium oxide species. Simultaneously, HMTA decomposes to form ammonium hydroxide. HMTA decomposition takes place in two steps, as in reactions (1) and (2):

$$(CH_2)_6N_4 + H^+ \rightarrow ((CH_2)_6N_4)H^+ \quad (1)$$

$$(CH_2)_6N_4H^+ + 9H_2O \rightarrow 6HCHO + NH_4^+ + 3NH_4OH \quad (2)$$

Metal ions further hydrolyze and condense as in reactions (3) and (4):

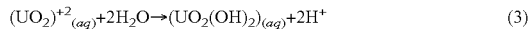

$$(UO_2)^{+2}_{(aq)} + 2H_2O \rightarrow (UO_2(OH)_2)_{(aq)} + 2H^+ \quad (3)$$

$$2(UO_2(OH)_2)_{(aq)} \rightarrow 2UO_3 \cdot 2H_2O \quad (4)$$

Ammonium hydroxide generated during reaction (2) increases the pH of the solution promoting hydrolysis and condensation (3), resulting in formation of the metal ion particulates $2UO_3 \cdot 2H_2O$ as spherical gel particles. The uranium oxide gel spheres are collected and sintered to form ceramic particles useful as kernels for nuclear fuel pellets.

During gel particle formation, metal oxide solution droplets are dispersed in a drive fluid at a high rate, and undergo rapid gelation from HMTA decomposition. The size of these gel particles is critical, in terms of nuclear fuel specifications. Specifically, the size of the sintered ceramic particles for use in nuclear fuel pellets is controlled by the size of the gel particles. Upon sintering, the gel particles lose about 35% of their mass, while the particle radius shrinks by about 65%. During the formation of gel particles in by internal gelation, the size of the gel particles formed is unknown until gelation is finished and the particles have been recovered. Upon characterization of the gel particles, it may be discovered that the particles are too large for preparation of a desired product, such as a nuclear fuel. Alternatively, the particles may be small for the desired application, or have an undesirably broad particle size distribution.

The present disclosure is directed to methods of preparing metal oxide gel particles with a controlled particle size, which allows particle size to be adjusted during particle formation.

The object is illustrative of advantages that can be achieved by the various embodiments disclosed herein, and is not intended to be exhaustive or limiting of the possible advantages which can be realized. Further advantages of the various embodiments disclosed herein will be apparent from the description herein, or can be learned from practicing the various embodiments disclosed herein or as modified in view of any variation that may be apparent to those skilled in the art. Accordingly, the present invention resides in the novel methods, arrangements, combinations, and improvements herein shown and described in various embodiments.

SUMMARY

Various embodiments disclosed herein relate to optical sensors which allow real-time analysis of the size of gel particles formed in a two-fluid nozzle, as well as flow rate of gel particles within the nozzle.

Various embodiments disclosed herein relate to a method of optimizing the size of metal oxide gel particles, including preparing a low-temperature aqueous metal nitrate solution containing hexamethylene tetramine as a feed solution; causing the feed solution to flow through a first nozzle and exit the first nozzle as a first stream at a first flow rate; and causing a high-temperature nonaqueous drive fluid to flow through a second nozzle as a second stream at a second flow rate, where the second stream contacts the first stream. In various embodiments, shear between the first stream and the second stream breaks the first stream into droplets of the metal nitrate solution, and thermal decomposition of hexamethylene tetramine by the high-temperature drive fluid converts metal nitrate solution droplets into metal oxide gel particles. The gel particles are carried in the second stream of the drive fluid. In various embodiments, a mean particle size of the metal oxide gel particles or mean flow rate of metal oxide gel particles in the drive fluid is measured optically, using a sensor device directed at a flow of the metal oxide gel particles within the stream of drive fluid.

In various embodiments, the sensor device measures transmission of light absorbed by either the metal oxide gel particles or the drive fluid, so that transmission of light through the drive fluid changes for a period of time as a metal oxide gel particle passes the sensor device. A time-dependent change in light transmission may be used to measure mean particle size or volumetric flow rate of the particles. In various embodiments, if the measured particle size or volumetric flow rate is not about equal to a desired droplet size or flow rate, adjusting said droplet size or flow rate by adjusting a ratio of the first flow rate to a total flow rate, where the total flow rate is the sum of the first and second flow rates.

In various embodiments, if a measured particle size is greater than a desired particle size, the measured particle size may be reduced by increasing the flow rate of the drive fluid; decreasing the flow rate of the feed solution, or both. If the measured particle size is less than a desired particle size, the measured particle size may be increased by decreasing the flow rate of the drive fluid; increasing the first flow rate of the feed solution, or both.

In various embodiments, the sensor device includes a first optical sensor and a second optical sensor, spaced from each other along the stream of drive fluid by a first distance; and each of the first and second sensors includes first and second optical fibers on opposite sides of the stream of drive fluid. The first optical fiber in each sensor sends a signal through the drive fluid, and the second optical fiber receives the signal. In various embodiments, the signal sent by the first optical fiber in each sensor is an optical signal at a wavelength which is not absorbed by the drive fluid, but is absorbed by the metal oxide gel particles. Within each sensor, the first and second optical fibers are separated by a distance which is at least equal to the diameter of the tube carrying the drive fluid, and which is small enough to prevent attenuation of the signal traveling through the drive fluid.

In various embodiments, the first sensor and the second sensor are spaced from each other along the second stream of drive fluid by the first distance. The first distance between the sensors is less than the mean diameter of the gel particles, where the mean diameter of the gel particles may be between 0.8 mm and 3.2 mm, between 1 and 2.5 mm, between 1 and 2 mm, between 1 and 1.5 mm, or between 1.5 and 2 mm. In various embodiments, the spacing between the sensors is from 0.1 mm to 1 mm, from 0.2 to 0.9 mm, from 0.3 to 0.8, or from 0.5 to 0.7 mm less than a desired target diameter of the gel particles.

In various embodiments, the mean particle size may be estimated by first calculating the speed of the metal oxide gel particle passing the first optical and/or the second optical sensor. In various embodiments, two sensors are spaced along a flow path by a known distance, and gel particle velocity is calculated based on the time for a leading end or a trailing end of a gel particle to travel this known distance. Once the speed of the gel particles is determined, the flowrate of the drive fluid carrying the gel particles past the sensors is calculated. Once the flowrate is calculated, the fraction of the flow filled with gel particles (gel particle volume) is then calculated by dividing a first length of time for a single gel particle to pass a single optical sensor by a second length of time for two sequential gel drops to reach a single optical sensor.

In various embodiments, an apparatus for producing metal oxide gel particles with a controlled particle size includes a system for forming metal oxide gel particles, featuring:
  a drive fluid nozzle defining a flow path, the drive fluid nozzle being configured to carry a drive stream of a drive fluid at a first flow rate along the flow path;
  a metal salt solution nozzle having an exit, the metal salt nozzle being configured to carry a first stream of a low-temperature aqueous metal salt solution containing hexamethylene tetramine into the flow path at a second flow rate; and optionally
  a heater configured to maintain a drive fluid temperature at a level sufficient to cause gelation of a metal salt in the metal salt solution by hexamethylene tetramine.

In various embodiments, the apparatus further includes a system for controlling a mean size of the metal oxide gel particles positioned downstream of the system for forming metal oxide gel particles. The system for controlling a size of the gel particles includes a sensor device including:
  a first sensor and a second sensor, spaced from each other along the flow path by a first distance, the first and second sensors being configured to measure a mean size of the gel particles and a particle flow rate; and
  a control system for adjusting the mean size of the metal oxide gel particles based on input from the sensor device.

In various embodiments, the system for controlling the mean gel particle size is configured to calculate a volumetric flow rate from a first transit time for a metal oxide gel particle to travel a distance between the first sensor and the second sensor.

In various embodiments, if a calculated gel particle size is different from a desired gel particle size, the system for controlling the mean size is configured to adjust the mean size of the gel particles by adjusting a ratio of the first flow rate of the drive fluid to a total flow rate, where the total flow rate is the sum of the first flow rate and the second flow rate of the metal salt solution.

In light of the present need for improved methods of preparing metal oxide gel particles with a predictable size, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

BRIEF DESCRIPTION OF THE DRAWINGS

In order to better understand various exemplary embodiments, reference is made to the accompanying drawings, wherein:

FIG. 1 shows an apparatus for monitoring the size of metal oxide gel particles formed in a two-fluid nozzle;

FIGS. 2 and 3 show output data produced by sensors in the apparatus of FIG. 1 as a metal oxide gel particle is detected by the sensors.

Figure 6:
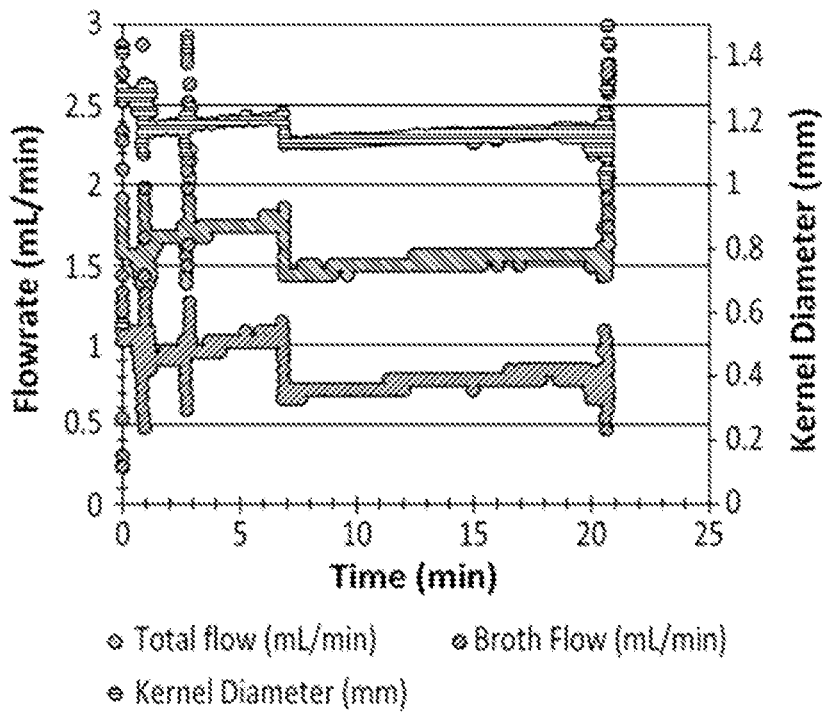
FIG. 6 shows:
  kernel diameter of sintered metal oxide particles prepared from gel particles, as a function of time;
  metal oxide broth solution flow rate as a function of time; and
  total flow rate as a function of time.
Figure 7:
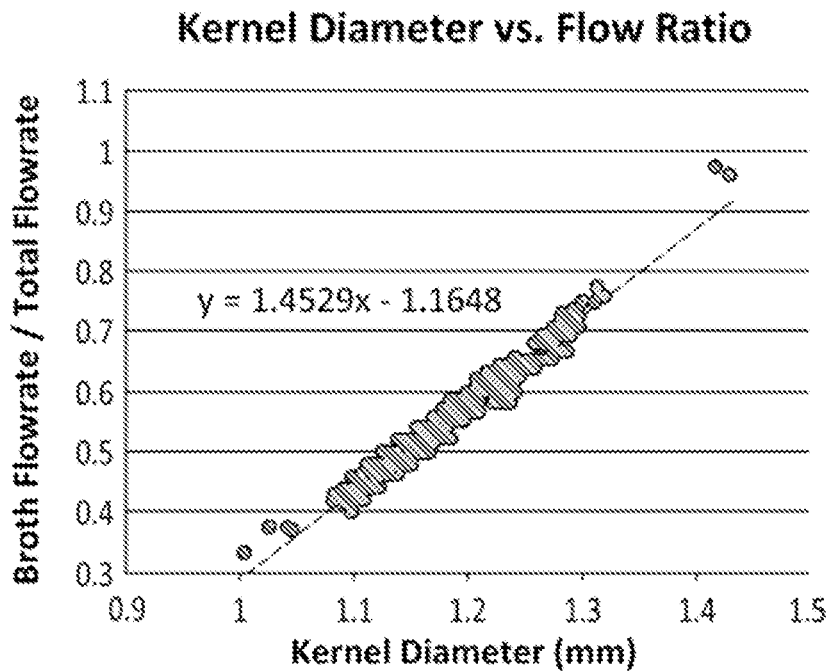
FIG. 7 shows a graph plotting kernel diameter as a function of the ratio of metal oxide broth solution flow rate to total flow rate.

Due to the large number of data points used to generate the data presented in FIGS. 6 and 7, the data has been presented as a cloud representing overlapping data points, rather than by plotting individual data points.

DETAILED DESCRIPTION

As used herein, the term "about" may be interpreted to mean "within 10% of the stated value," "within 5% of the stated value," or "within 3% of the stated value." All numbers stated without a qualifier may be interpreted in terms of significant figures.

As used herein, the language "configured to," as applied to an apparatus or part thereof, means that the recited apparatus or element is designed or constructed to perform the recited function.

As used herein, the term "diameter," referred to herein as m1, refers to the length of the particle as it travels through a tube past an optical sensor. In some cases, the tube diameter may be less than the particle length, causing the particle to elongate along the length of the tube. In other cases, the tube diameter may be greater than or about equal to the particle length, causing the particle to be substantially spherical. In either case, the distance along the length of the particle shall be referred to as its diameter m1.

Referring now to the drawings, in which like numerals refer to like components or steps, there are disclosed broad aspects of various exemplary embodiments.

FIG. 1 is a view of a system for measuring the size of metal oxide gel particles. The system includes a nozzle or tube 1 configured to carry a nonaqueous drive fluid ("the drive fluid nozzle"), where the drive fluid is carried within the nozzle or tube 1 in a flow path marked by arrow A at a first flow rate. Gel particles 3 having a diameter m1 (shown as being equal to the length of an elongated particle in FIG. 1) travel along the nozzle or tube 1 in the direction of arrow A past a first sensor 4 and a second sensor 5, each connected to CPU 10. Sensor 4 has two optical fibers 6 and 7, separated by nozzle or tube 1. An optical signal at a selected wavelength is transmitted from fiber 6 to fiber 7, in the direction of arrow B. The drive fluid is transparent to the selected wavelength, while gel particles 3 are translucent or opaque to the selected wavelength. A signal corresponding to a time-dependent change in light intensity between the light transmitted from fiber 6 and the light received by fiber 7 is transmitted to CPU 10. An output from sensors 4 and 5 is transmitted through cables 13 and 14 to CPU 10, where particle size is calculated.

FIG. 2 shows the time-dependent change in light intensity as a series of gel particles pass sensor 4. If the change in light intensity between the light transmitted from fiber 6 and the light received by fiber 7 is less than a predetermined background value, the CPU outputs a value of zero. If the change in light intensity exceeds a predetermined background value due to the presence of a gel particle 3 between fibers 6 and 7, the CPU outputs a value of one, resulting in a time-dependent signal in the form of a series of square waves 11. Each square wave 11 has a leading edge 11a and a trailing edge 11b. The length of each square wave corresponds to the period of time for a single gel particle to pass sensor 4 (Period P). The time between leading edges 11a (or trailing edges 11b) of adjacent square waves provides the frequency F with which gel particles pass sensor 6. If all particles 3 have similar sizes, period and frequency may be determined from two adjacent square waves. If particles 3 have different sizes, an average or mean value of period and frequency may be determined from a series of square waves 11.

As shown in FIG. 1, sensor 5 has two optical fibers 8 and 9, separated by tube 1. An optical signal at a selected wavelength is transmitted from fiber 8 to fiber 9. A signal corresponding to a time-dependent change in light intensity between the light transmitted from fiber 6 and the light received by fiber 7 is transmitted to CPU 10. FIG. 3 shows the time-dependent change in light intensity as a series of gel particles pass sensor 4, and as a series of gel particles pass sensor 5. Sensors 4 and 5 are arranged so that a distance x1 between fibers 6 and 7 is less than a desired gel particle diameter m1.

As seen in FIG. 3, sensors 4 and 5 each provide time-dependent change in light intensity as a series of square waves 11, offset by a time period $\Delta T$. Period P and frequency F may be calculated from either the output from sensor 4 or the output from sensor 5, or as an average values obtained from both sensor 4 and sensor 5.

Once the period P, the frequency F, and the offset $\Delta T$ have been determined, particle velocities, flowrates, and particle volume may be determined. First, the velocity of a particle may be determined from the offset time $\Delta T$, corresponding to the length of time it takes for the leading end or trailing end of a single particle to travel distance x1 between sensor 4 and sensor 5. Velocity V may be calculated as follows:

$$V = x1/\Delta T \tag{5}$$

The total volumetric flowrate, Flow, of the metal ion solution and the drive fluid through tube 1 may be calculated from velocity v and the inner diameter d1 of tube 1 as follows:

$$\text{Flow} = [V(d1)^2/4]\pi \tag{6}$$

The metal ion solution flowrate, $\text{Flow}_M$, may be calculated as follows:

$$\text{Flow}_M = (P/F) * \text{Flow} \tag{7}$$

This may be rearranged as follows:

$$\text{Flow}_M/\text{Flow} = P/F \tag{7}$$

When the ratio $\text{Flow}_M/\text{Flow}$ is plotted as a function of particle diameter of kernels obtained by sintering gel particles, the particle diameter shows a linear dependence with $\text{Flow}_M/\text{Flow}$, at least when $0.4 < \text{Flow}_M/\text{Flow} < 0.8$. Thus, by manipulating this flow ratio, particle size can be controlled.

The gel particle volume may be estimated by multiplying the period P by the flowrate Flow:

$$\text{Particle Volume} = P * \text{Flow} = P[V((d1)^2/4)]\pi \tag{8}$$

Returning to FIG. 1, a solution carrying a metal oxide salt solution passes through tube 12 and intersects tube 1, carrying the drive fluid in a flow path marked by arrow A at a first flow rate. Tube 12 carries a low-temperature aqueous metal salt solution ("the salt solution") in a flow path marked by arrow C at a second flow rate. The exit of tube 12 is within the flow path of the drive fluid in tube 1. The metal oxide salt may be a salt of a lanthanide metal, plutonium, uranium, or thorium. The metal oxide salt may also be any salt which undergoes gelation upon reaction with ammonia or ammonium hydroxide.

As the salt solution exits tube 12, shear between the stream of salt solution and the drive fluid stream breaks the salt solution stream into particles of salt solution dispersed in the drive fluid. In various embodiments, the salt solution contains hexamethylene tetramine (HMTA), and the drive fluid is heated to a temperature sufficient to cause the HMTA to decompose into ammonia and formaldehyde. The ammonia then causes the salt solution particles to gel into spherical metal oxide gel particles 3. Particles 3 are carried along nozzle 1 by the drive fluid stream in the direction of arrow A.

Although FIG. 1 shows the metal oxide solution-carrying tube 12 as intersecting tube 1 at a right angle, this is not a necessary feature of the apparatus of FIG. 1. In some embodiments, tube 1 and tube 12 may be coaxial, with tube 12 being inside tube 1. Alternatively, tubes 1 and 12 may intersect and form a single common tube. All that is required is that the salt solution in tube 12 flow into a flowing drive fluid carried by tube 1.

In various embodiments, a metal oxide compound, such as $UO_3$, $U_3O_8$, $UO_2(NO_3)_2$, thorium or plutonium nitrates, or lanthanide metal nitrates is used to form the metal oxide salt solution. The metal oxide compound is dissolved in an aqueous solution to form a metal-containing salt solution. In various embodiments, the metal oxide compound is a uranium compound, such as $UO_3$, $U_3O_8$, or $UO_2(NO_3)2$. The salt solution may also contain urea and HMTA. In various embodiments, the salt solution may be an acid-deficient uranyl nitrate solution containing water, $UO_3$, and either $HNO_3$ or $UO_2(NO_3)_2$. Urea reacts with the metal ion at low temperatures to form complexes which resist premature gelation, such as $UO_2(NH_2CO)_2^{+2}$.

The nonaqueous drive fluid may be heated to a temperature of 50° C. to 90° C., 50° C. to 80° C., 55° C. to 75° C., 55° C. to 70° C., or about 60±5° C. In the case of a uranyl nitrate solution, when the salt solution leaves tube 12 and contacts the drive fluid, the metal ion-urea complexes may dissociate to form $UO_2^{+2}$. Simultaneously, HMTA decomposes to form ammonium hydroxide and formaldehyde. The ammonium hydroxide generated by HMTA decomposition reacts neutralizes the uranium oxide species and stimulates formation of the metal ion polymer $(UO_2(OH))_n^{+n}$ as spherical gel particles 3 in nozzle 1.

Figure 4:
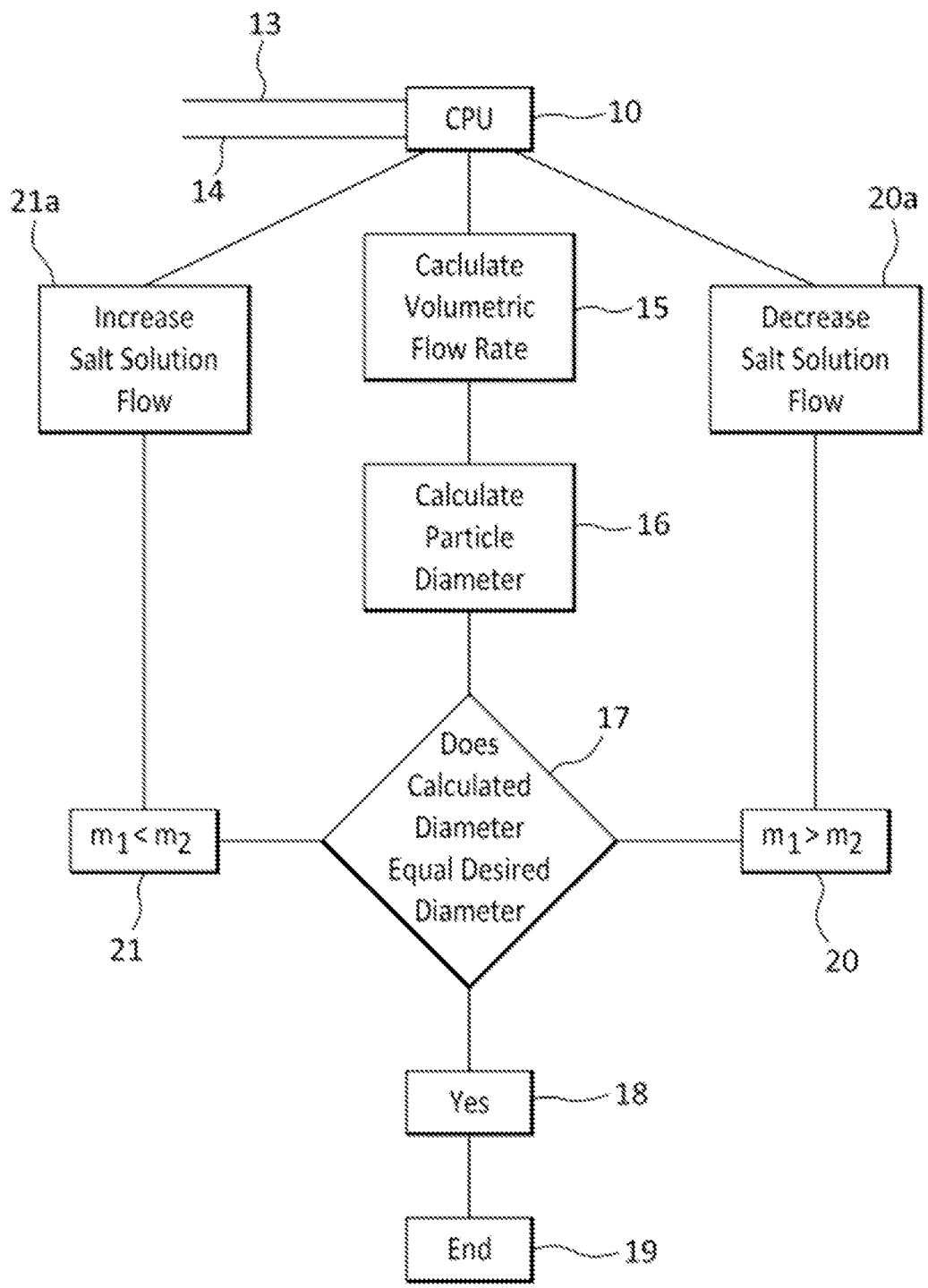
FIG. 4 shows a flow chart showing processes for controlling the size of metal oxide gel particles formed in a two-fluid nozzle.

Based on inputs from sensors 4 and 5 through cables 13 and 14, the CPU 10 controls a control system for adjusting the mean size of the metal oxide gel particles, as shown in FIG. 4. The CPU receives data from sensors 4 and 5 defining a first transit time ($\Delta T$) for a gel particle to travel a first distance $x_1$ between sensors 4 and 5. This transit time $\Delta T$ is converted into a volumetric flow rate in step 15 of FIG. 4 by calculating a particle velocity from time $\Delta T$ for a metal oxide gel particle to travel distance $x_1$ using equation (5) above, and multiplying the particle velocity by a cross sectional area of the drive fluid stream according to equation (6) above to determine a volumetric flow rate.

In step 16 of FIG. 4, a metal oxide gel particle size m1, as shown in FIG. 1, is calculated by multiplying the volumetric flow rate calculated in step 13 by the period P depicted in FIG. 4 to determine a particle volume.

In step 17 of FIG. 4, the calculated particle diameter $m_1$ may be compared to a desired particle diameter m2. If $m_1=m_2$ (step 18), then the conditions of particle gelation in nozzle 1 are unchanged, and the analysis ends (step 19). If $m_1>m_2$ (step 20), then the gel particles are too large, and the CPU adjusts the relative flow rate of the drive fluid in tube 1 and the salt solution in tube 12 of FIG. 1. By decreasing the ratio of the salt solution flow rate A to the sum of flow rate A and the drive fluid flow rate B, e.g., by decreasing salt solution flow rate (step 20a) relative to drive fluid flow rate, shear between the two solutions in nozzle 1 of FIG. 1 increases, reducing the size of particles of salt solution dispersed in the drive fluid.

If $m_1<m_2$ (step 21), then the gel particles are too small, and the CPU increases the ratio of the salt solution flow rate A to the sum of flow rate A and the drive fluid flow rate B, e.g., by increasing salt solution flow rate (step 20a) relative to drive fluid flow rate, in order to reduce the size of particles of salt solution dispersed in the drive fluid.

Figure 5:
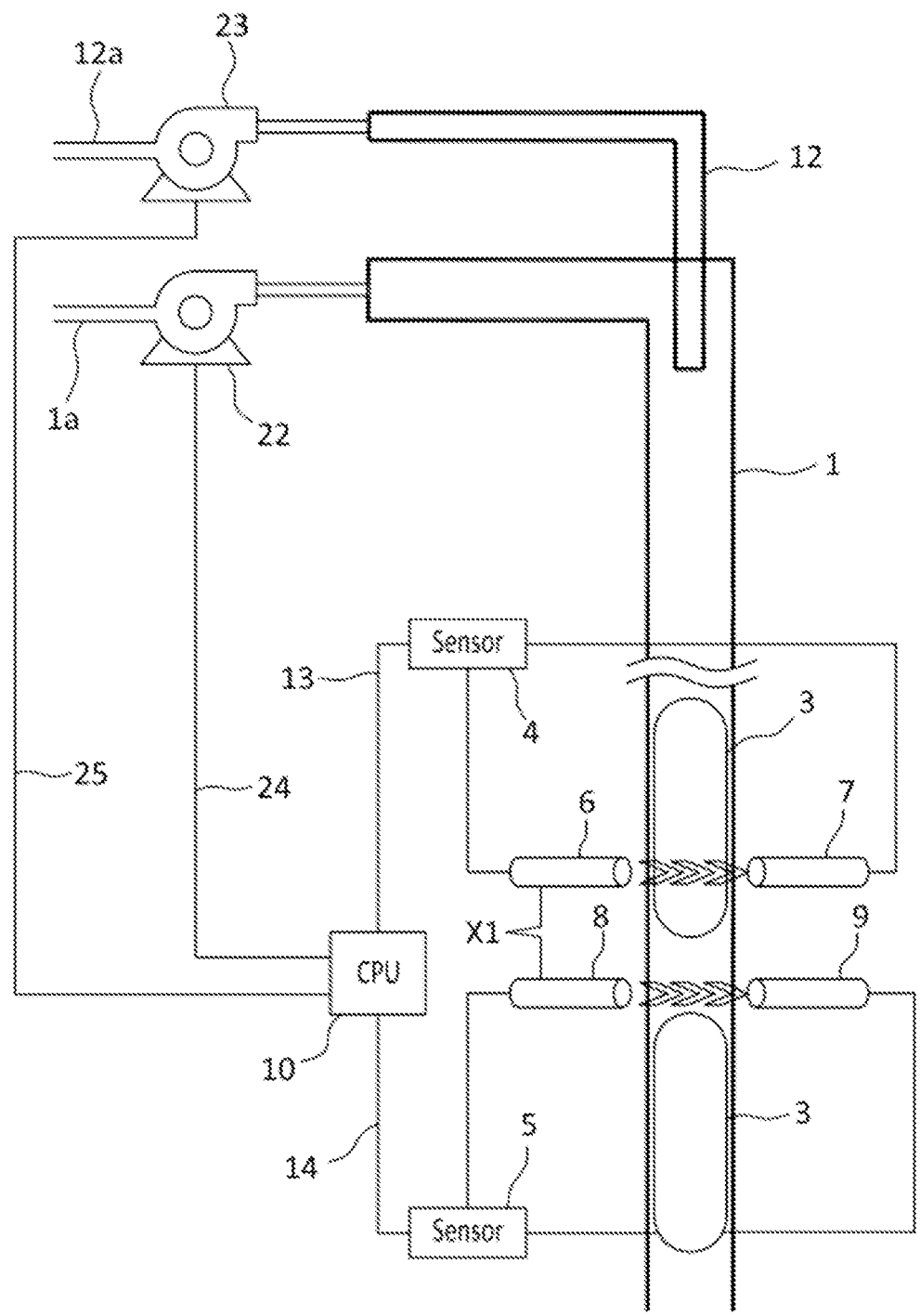
FIG. 5 shows an apparatus of FIG. 1, in conjunction with a CPU and pumps controlled by the CPU.

FIG. 5 shows the apparatus of FIG. 1, in conjunction with CPU 10, as part of a system which allows that user to adjust the size of gel particles 3. FIG. 5 shows tube 1, configured to carry the drive fluid in a flow path marked by arrow A at a first flow rate; and tube 12 configured to carry an aqueous metal salt solution in a flow path marked by arrow B at a second flow rate. The exit of tube 12 is within the flow path of tube 1 (Note that tubes 1 and 12 are coaxial in the system of FIG. 5, but perpendicular in FIG. 1). The drive fluid is driven to tube 1 from tube 1a by pump 22. The salt solution is driven to tube 12 from tube 12a by pump 23. Data from sensors 4 and 5 travels to CPU 10 through cables 13 and 14, where volumetric flow rate of the stream in nozzle 1, particle volume, and particle diameter may be calculated, as seen in FIG. 4. If the calculated gel particle diameter $m_1$ is not about equal to a desired particle diameter $m_2$, the CPU signals pumps 22 and 23 through cables 24 and 25 to change the relative speeds of pumps 22 and 23. The CPU thus manipulates the relative flow rate of drive fluid and salt solution, controlling the degree of shear between drive fluid and salt solution after the salt solution exits nozzle 2 and contacts the drive fluid. Increased shear causes the salt solution to break into smaller droplets, while decreased shear causes the salt solution to break into larger droplets.

Example 1: Controlling Gel Particle Diameter by Manipulating Flow Rates

An acid-deficient uranyl nitrate solution with a concentration of 1.3 M, based on $UO_2(NO_3)_2$, was prepared. The solution contained 1.7 M urea and 1.7 M HMTA, and had a viscosity of about 1.2 cP. The salt solution was pumped into tube 12 of an apparatus according to FIG. 1 at a temperature of 0° C. to 5° C. The salt solution, or broth, exited tube 12 at a flow rate generally ranging between 0.5 mL/min and 1.5 mL/min, as seen in FIG. 6. The salt solution then enters drive fluid tube 1.

A drive fluid was pumped into tube 1 of the apparatus of FIG. 1. The drive fluid was silicone oil with a viscosity of 100 cP, at an initial temperature of 0° C. to 5° C. The drive solution flow rate is controlled to maintain a total flow rate generally ranging between 1.3 mL/min and 2.25 mL/min, as seen in FIG. 6. Once the drive fluid and the salt solution enter tube 1, the contents of tube 1 are heated to a temperature of about 56° C., inducing thermal gelation of the salt solution by HMTA induced gelation of uranyl nitrate to form uranium oxide gel particles.

Data was recorded using an apparatus according to FIG. 1. The diameter of nozzle 1 was 1 mm. Referring to FIG. 1, distance $x_1$ between sensors 4 and 5 was 6.35 mm. The distance between the optical fibers in each sensor 4 and 5, e.g., between fiber 6 and 7 in sensor 4, was 3.2 mm. Each fiber optic sensor 6, 7, 8, and 9 had a diameter of 1.6 mm. Red light having a wavelength of 680 nm was used to detect gel spheres as they passed the fiber optic sensors.

In a first trial, the flow rates of the drive fluid and the salt solution were recorded as a function of time by a processor, as shown in FIG. 6. The processor also recorded period P and frequency F of gel particles in the flowing drive fluid. Thermal gelation by decomposition of HMTA induced by the heated drive fluid produced uranium oxide gel particles. Gel particle volume was calculated as a function of period P and total flowrate, according to Equation (8). The processor was configured to calculate the volume and diameter of the sintered uranium oxide particles, based on an expected 65% loss in gel particle volume upon sintering. The calculated diameter of the sintered uranium oxide particles, or kernels, was plotted as a function of time, as shown in FIG. 6. As shown in FIG. 6 and Table 1, manipulating the total flow rate and the salt solution flow rate changes the diameter of the kernel particles produced by sintering the gel particles.

TABLE 1

| Time (sec) | Total Flow Rate (Flow; mL/min) | Broth Flow Rate (Flow$_M$; mL/min) | Flow$_M$/Flow | Kernel Diameter (mm) |
|---|---|---|---|---|
| 30 | 1.56 | 1.08 | 0.69 | 1.28 |
| 120 | 1.68 | 0.9 | 0.54 | 1.18 |
| 360 | 1.74 | 1.02 | 0.59 | 1.21 |
| 480 | 1.44 | 0.72 | 0.5 | 1.14 |

When the flow ratio Flow/Flow$_M$ was plotted as a function of kernel diameter, as shown in FIG. 7, there was a linear dependence of kernel diameter on the flow ratio Flow/Flow$_M$ when $0.3<$Flow/Flow$_M<0.8$, or when $0.4<$Flow/Flow$_M<0.75$. This shows that kernel diameter can be controlled by manipulating the ratio of metal ion solution flow rate to total flow rate.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of measuring the size of metal oxide gel particles in a flowing stream, comprising:
    a. causing a stream of a drive fluid containing metal oxide gel particles to flow past at least two optical sensors, the at least two sensors being separated by a distance which is less than a desired particle size;
    b. measuring a metal oxide gel particle size or flow rate optically with the at least two optical sensors;
    said optical sensors measuring transmission of light at a defined wavelength absorbed by either the metal oxide gel particles or the drive fluid, so that transmission of light through the drive fluid at the defined wavelength changes for a period of time as a metal oxide gel particle passes the optical sensors.

2. The method of claim 1, wherein measuring a metal oxide gel flowrate comprises:
    measuring a velocity of a gel particle in the flowing stream by measuring a time $\Delta T$ for a leading or trailing edge of the gel particle to travel from a first optical sensor to a second optical sensor, and dividing a distance between the first and second optical sensors by $\Delta T$; and
    multiplying the velocity of the gel particle by a cross sectional area of the flowing stream.

3. The method of claim 1, wherein measuring a metal oxide particle size comprises:
    measuring a velocity of a gel particle in the flowing stream by measuring a time $\Delta T$ for a leading or trailing edge of the gel particle to travel from a first optical sensor to a second optical sensor, and dividing a distance between the first and second optical sensors by $\Delta T$;
    determining a flow rate of the flowing stream by multiplying the velocity of the gel particle by a cross sectional area of the flowing stream; and
    multiplying the flow rate by a period of time for the gel particle to pass the first optical sensor.

4. A method of optimizing the size of metal oxide gel particles, comprising:
    a. preparing a low-temperature aqueous metal nitrate solution containing hexamethylene tetramine as a feed solution;
    b. causing the feed solution to flow through a first nozzle and exit the first nozzle as a first stream at a first flow rate;
    c. causing a nonaqueous drive fluid to flow through a second nozzle as a second stream at a second flow rate, where said second stream contacts said first stream; wherein:
        shear between the first stream and the second stream breaks the first stream into particles of said metal nitrate solution, and
        decomposition of hexamethylene tetramine converts metal nitrate solution particles into metal oxide gel particles;
    d. measuring a metal oxide gel particle size or flow rate optically, using an optical sensor directed at a flow of said metal oxide gel particles within said second stream of drive fluid;
        said optical sensor measuring transmission of light at a defined wavelength absorbed by either the metal oxide gel particles or the drive fluid, so that transmission of light through the drive fluid at the defined wavelength changes for a period of time as a metal oxide gel particle passes the optical sensor; and
    e. if said measured particle size or flow rate is not about equal to a desired particle size or flow rate, adjusting said particle size or flow rate by adjusting a ratio of the first flow rate to a total flow rate, where the total flow rate is the sum of the first and second flow rates.

5. The method of claim 4, wherein said measured particle size is greater than a desired particle size, and said measured particle size is reduced by decreasing the first flow rate of the feed solution.

6. The method of claim 4, wherein said measured particle size is less than a desired particle size, and said measured particle size is increased by increasing the first flow rate of the feed solution.

7. The method of claim 4, wherein said measured particle size is different from a desired particle size, and said measured particle size is changed by changing the first flow rate of the feed solution.

8. The method of claim 7, wherein the optical sensor comprises a first optical sensor and a second optical sensor, spaced from each other along the second stream of drive fluid by a first distance, the first distance being less than a desired particle size.

9. The method of claim 8, wherein measuring a metal oxide gel flow rate comprises:
    measuring a velocity of a gel particle in the flowing stream by measuring a time $\Delta T$ for a leading or trailing edge of the gel particle to travel from the first optical sensor to the second optical sensor, and dividing a distance between the first and second optical sensors by $\Delta T$; and multiplying the velocity of the gel particle by a cross sectional area of the flowing stream.

10. The method of claim 8, wherein measuring a metal oxide particle size comprises:
measuring a velocity of a gel particle in the flowing stream by measuring a time ΔT for a leading or trailing edge of the gel particle to travel from the first optical sensor to the second optical sensor, and dividing a distance between the first and second optical sensors by ΔT;
determining a flow rate of the flowing stream by multiplying the velocity of the gel particle by a cross sectional area of the flowing stream; and
multiplying the flow rate by a period of time for the gel particle to pass the first optical sensor.

11. A method of optimizing the size of metal oxide gel particles, comprising:
a. preparing a low-temperature aqueous metal nitrate solution containing hexamethylene tetramine as a feed solution;
b. causing the feed solution to flow through a first nozzle and exit the first nozzle as a first stream at a first flow rate;
c. causing a nonaqueous drive fluid to flow through a second nozzle as a second stream at a second flow rate, where said second stream contacts said first stream; wherein:
shear between the first stream and the second stream breaks the first stream into particles of said metal nitrate solution, and
decomposition of hexamethylene tetramine converts metal nitrate solution particles into metal oxide gel particles;
d. measuring a metal oxide gel particle size or flow rate optically, using a sensor device directed at a flow of said metal oxide gel particles within said second stream of drive fluid;
wherein the sensor device comprises a first optical sensor and a second optical sensor, spaced from each other along the second stream of drive fluid by a first distance, the first distance being less than a desired particle size;
said first optical sensor and said second optical sensor each measuring transmission of light at a defined wavelength absorbed by either the metal oxide gel particles or the drive fluid, so that transmission of light at the defined wavelength through the drive fluid changes for a period of time as a metal oxide gel particle passes either of the first optical sensor and the second optical sensor; and
e. if said measured particle size or flow rate is not about equal to a desired particle size or flow rate, adjusting said particle size or flow rate by adjusting a ratio of the first flow rate to a total flow rate, where the total flow rate is the sum of the first and second flow rates.

12. The method of claim 11, wherein said measured particle size is greater than a desired particle size, and said measured particle size is reduced by decreasing the first flow rate of the feed solution.

13. The method of claim 11, wherein said measured particle size is less than a desired particle size, and said measured particle size is increased by increasing the first flow rate of the feed solution.

14. The method of claim 11, wherein said measured particle size is different from a desired particle size, and said measured particle size is changed by changing the first flow rate of the feed solution.

15. The method of claim 11, wherein measuring a metal oxide gel flow rate comprises:
measuring a velocity of a gel particle in the flowing stream by measuring a time ΔT for a leading or trailing edge of the gel particle to travel from the first optical sensor to the second optical sensor, and dividing a distance between the first and second optical sensors by ΔT; and
multiplying the velocity of the gel particle by a cross sectional area of the flowing stream.

16. The method of claim 11, wherein measuring a metal oxide particle size comprises:
measuring a velocity of a gel particle in the flowing stream by measuring a time ΔT for a leading or trailing edge of the gel particle to travel from the first optical sensor to the second optical sensor, and dividing a distance between the first and second optical sensors by ΔT;
determining a flow rate of the flowing stream by multiplying the velocity of the gel particle by a cross sectional area of the flowing stream; and
multiplying the flow rate by a period of time for the gel particle to pass the first optical sensor.

17. A method of optimizing the size of metal oxide gel particles, comprising:
a. preparing a low-temperature aqueous metal nitrate solution containing hexamethylene tetramine as a feed solution;
b. causing the feed solution to flow through a first nozzle and exit the first nozzle as a first stream at a first flow rate;
c. causing a nonaqueous drive fluid to flow through a second nozzle as a second stream at a second flow rate, where said second stream contacts said first stream; wherein:
shear between the first stream and the second stream breaks the first stream into particles of said metal nitrate solution, and
decomposition of hexamethylene tetramine converts metal nitrate solution particles into metal oxide gel particles in the second stream;
d. measuring the size of the metal oxide gel particles in the second stream by the method of claim 1; and
e. if said measured particle size or flow rate is not about equal to a desired particle size or flow rate, adjusting said particle size or flow rate by adjusting a ratio of the first flow rate to a total flow rate, where the total flow rate is the sum of the first and second flow rates.

18. The method of claim 1, wherein:
said at least two optical sensors each comprise a first optical fiber and a corresponding second optical fiber, the first and corresponding second optical fibers being on opposite sides of the stream of drive fluid; and
the first optical fiber in each optical sensor transmits light at the defined wavelength to the corresponding second optical fiber.

19. The method of claim 4, wherein:
said optical sensor comprises a first optical fiber and a corresponding second optical fiber, the first and second optical fibers being on opposite sides of the stream of drive fluid; and
the first optical fiber transmits light at the defined wavelength to the corresponding second optical fiber.

20. The method of claim 11, wherein:
said first optical sensor and said second optical sensor each comprise a first optical fiber and a corresponding second optical fiber, the first and corresponding second optical fibers being on opposite sides of the stream of drive fluid; and the first optical fiber in each of the first optical sensor and the second optical sensor transmits light at the defined wavelength to the corresponding second optical fiber.

\* \* \* \* \*